(No Model.)
D. B. MACONACHIE.
HORSE WEIGHT.
No. 536,473. Patented Mar. 26, 1895.
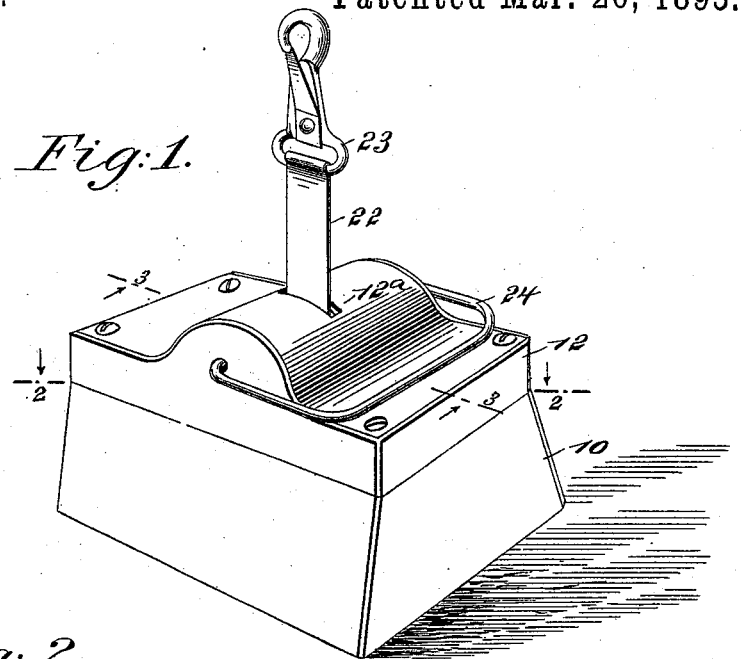
Fig. 1.
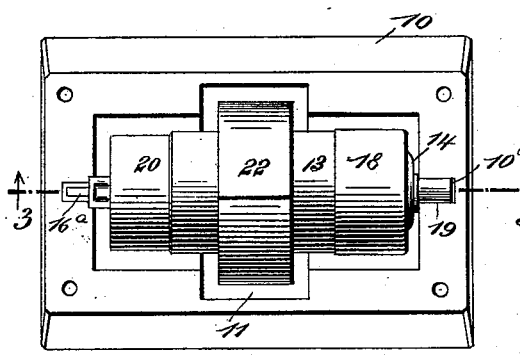
Fig. 2.
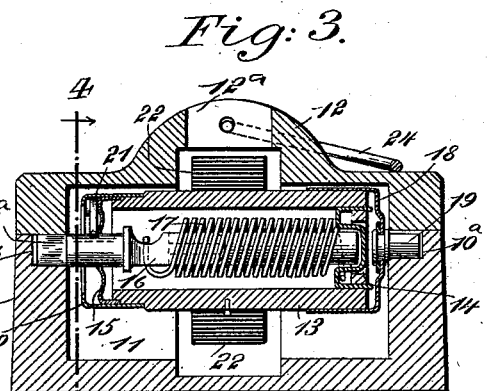
Fig. 3.
Fig. 4.
WITNESSES:
John A. Rennie.
Wm. P. Patton
INVENTOR
D. B. Maconachie
BY
Munn & Co.
ATTORNEYS.
THE NORRIS PETERS CO., PHOTO-LITHO., WASHINGTON, D. C.

UNITED STATES PATENT OFFICE.

DAVID B. MACONACHIE, OF TORONTO, CANADA.

HORSE-WEIGHT.

SPECIFICATION forming part of Letters Patent No. 536,473, dated March 26, 1895.

Application filed December 18, 1894. Serial No. 532,146. (No model.)

*To all whom it may concern:*

Be it known that I, DAVID B. MACONACHIE, of Parkdale, Toronto, in the Province of Ontario and Dominion of Canada, have invented a new and Improved Horse-Weight, of which the following is a full, clear, and exact description.

This invention relates to an improvement in a portable weight and halter, for the temporary securing of a horse or other draft animal at a desired locality, and the object of the invention is to provide a horse weight that will be convenient to handle, and that is provided with a self-wrapping halter, which will be adapted for extension from the weight of a desired length when put into service, and that will automatically return within the weight when the animal is detached from the halter and the weight is to be placed in a vehicle for subsequent use.

The invention consists in the peculiar construction and combination of parts as is hereinafter described and claimed.

Reference is to be had to the accompanying drawings, forming a part of this specification, in which similar figures and letters of reference indicate corresponding parts in all the views.

Figure 1 is a perspective view of the device. Fig. 2 is a plan view of parts within the weight block that are exposed by the removal of the cap piece of the weight, on the line 2—2 in Fig. 1. Fig. 3 is a longitudinal sectional view substantially on the line 3—3 in Figs. 1 and 2; and Fig. 4 is a transverse sectional view substantially on the line 4—4 in Fig. 3.

The body or main portion 10 of the weight block, is preferably given a rectangular contour and tapered slightly on two sides from the bottom toward the top, the end walls being vertical. The dimensions of the block 10 are proportioned to adapt the entire device for convenient and efficient service, and it is recessed as shown at 11, for the reception of parts that will presently be described.

A cap piece 12 is provided for the block 10, which is preferably shaped as shown, it having a marginal form similar to that of the upper edge of the block it is designed to fit upon, and at or near its longitudinal center has an arched projection formed on it.

The recess or chamber 11 is elongated sufficiently to adapt it to receive the cylindrical roller 13, and attachments thereto. The roller 13 is axially bored so as to produce a hollow cylinder, and on each end of the roller the boxes 14 and 15 are secured. One of the boxes 14 has a concentric socket formed on it, which socket is on the inner side. The box 15 is centrally perforated and the boxes 14, 15 are each provided with a laterally projecting flange on the periphery for their attachment to the ends of the cylindrical roller 13.

A shaft 16 is provided having a length so proportioned that when one journaled end of the said shaft is loosely embedded in the socket of the box 14, a cylindric bearing on the shaft will have a loose engagement with the perforated box 15, and an end portion of the journal shaft be projected a short distance from said box.

A spiral spring 17 is furnished of proper length and tensional strength for effective service, and as is shown in Fig. 3 the spring is mounted on the shaft 16, occupying an annular space in the roller 13. One end of the spiral spring is secured to the socketed box 14 and its opposite end attached to the shaft body.

At the end of the roller 13 wherein the socketed box 14 is embedded, a cupped ferrule 18 is slid upon and secured to the roller, and from the centrally perforated end wall of said ferrule a journal stem 19 is outwardly projected in axial alignment with the shaft 16, the stem being firmly attached to the ferrule so as to afford a fixed journal for the roller.

A suitable box bearing 10ª is formed in the upper edge of one end wall of the weight block 10, for the reception of the journal stem 19, the bearing having a semi-cylindrical bottom and vertical sides which adapt it to loosely embrace the stem.

The end portion 16ª of the shaft 16, which is projected beyond the perforated box 15 is oppositely flattened to produce two parallel sides thereon, and a notched recess 10ᵇ is formed in the upper edge of the adjacent end wall of the weight block 10, as is represented in Fig. 3, the flattened portion of the shaft being inserted and caused to interlock with this recess when the roller is in an operative position within the weight block.

A cupped ferrule 20 is secured on the roller 13 at the end of the same wherein the perforated box 15 is secured, a sufficient space intervening said parts 15, 20, to permit the pawl 21 to be pivoted on the box 15; and one or more indentations are produced in the shaft 16, wherein the toe of the pawl may enter, so as to lock the roller and shaft together.

The formation of the pawl toe and one or more indentations in the shaft body, is such that a rapid rotation of the roller 13, will prevent the said toe from entering an indentation of the shaft, a slow movement of the roller allowing the pawl to drop by gravity into one of the said pockets or indentations.

The cap piece 12 is recessed as shown in Figs. 3 and 4, and the cap and weight block are secured together by screws or other means. When the cap piece 12 is secured in place on the weight block, it is evident that the end of the shaft 16 will be firmly bound in the notch or open recess 10$^b$, as the cap piece will have a bearing on the upper edge of the flattened end portion of the shaft that is located in the slot or recess named.

A halter strap or band 22 of a suitable length is secured by one end on the roller 13 and wrapped on it, so that the free end of the halter may be extended through a slot 12$^a$ that is formed in the cap piece 12, said extended end portion of the halter being preferably provided with a snap hook 23.

There is a bail handle 24 pivoted by its ends in the side edges of the cap piece 12, which handle affords means for the convenient manipulation of the horse weight when it is to be handled.

It will be seen that if the flexible halter 22 which may be made of leather or woven fabric, is wrapped on the roller 13 in a proper direction while the spiral spring 17 is in a normal condition, and the free end of the halter band is inserted through the slot 12$^a$ and forcibly drawn upon so as to rotate the roller rapidly, the spring 17 will be tightly coiled and the partial or total arrest of draft strain on the halter band will allow the pawl 21 to interlock with one of the indentations in the shaft 16, which will retain the spring in a tightly coiled condition.

The halter band 22 will remain extended, and enable the tethering of a horse temporarily at a desired point while hitched to a vehicle, by reason of the attached weight block, and when the snap hook 23 is released from the bit of the harness to which it has been connected, and the weight is to be placed in the vehicle for re-use as occasion may require, a pull on the halter band of sufficient force will release the pawl from the shaft 16, and permit the torsional force of the spring 17 to wrap up the band on the roller 13, and thus store it within the weight block, which may then be readily handled by use of the bail handle to place it in the vehicle to which the horse is connected.

Having thus described my invention, I claim as new and desire to secure by Letters Patent—

1. The combination of the hollow weight block having aligning recesses in its upper face, the spring-controlled strap roller provided with axially projecting ends supported in the said recesses, one of the ends being angular and forming a journal upon which the roller is mounted to rotate, and the slotted cap piece covering the said recesses so as to hold the roller ends therein and prevent rotation of the said angular end, substantially as described.

2. The combination with a chambered weight block, and a slotted cap piece securable on said weight block, of a hollow roller journaled at one end in a recessed edge of the weight block, a shaft within the roller and journaled at one end in an end wall of the roller, a torsion spring on the shaft, fastened at one end to said end wall and at the other end to the shaft, a pawl pivoted on the opposite end wall of the roller and adapted to interlock with an indent in the shaft body near its other end, which end is interlocked with a notch in the opposite edge of the weight block and held in place by the secured cap piece, and a halter band fastened at one end to the roller and extending therefrom through the slot in the cap piece, substantially as described.

DAVID B. MACONACHIE.

Witnesses:
WALTER C. SHIELDS,
THOS. BLACK.